G. A. JASPER.
Apparatus for Detecting Sugar, &c., in Waste Liquids.
No. 41,008. Patented Dec. 22, 1863.
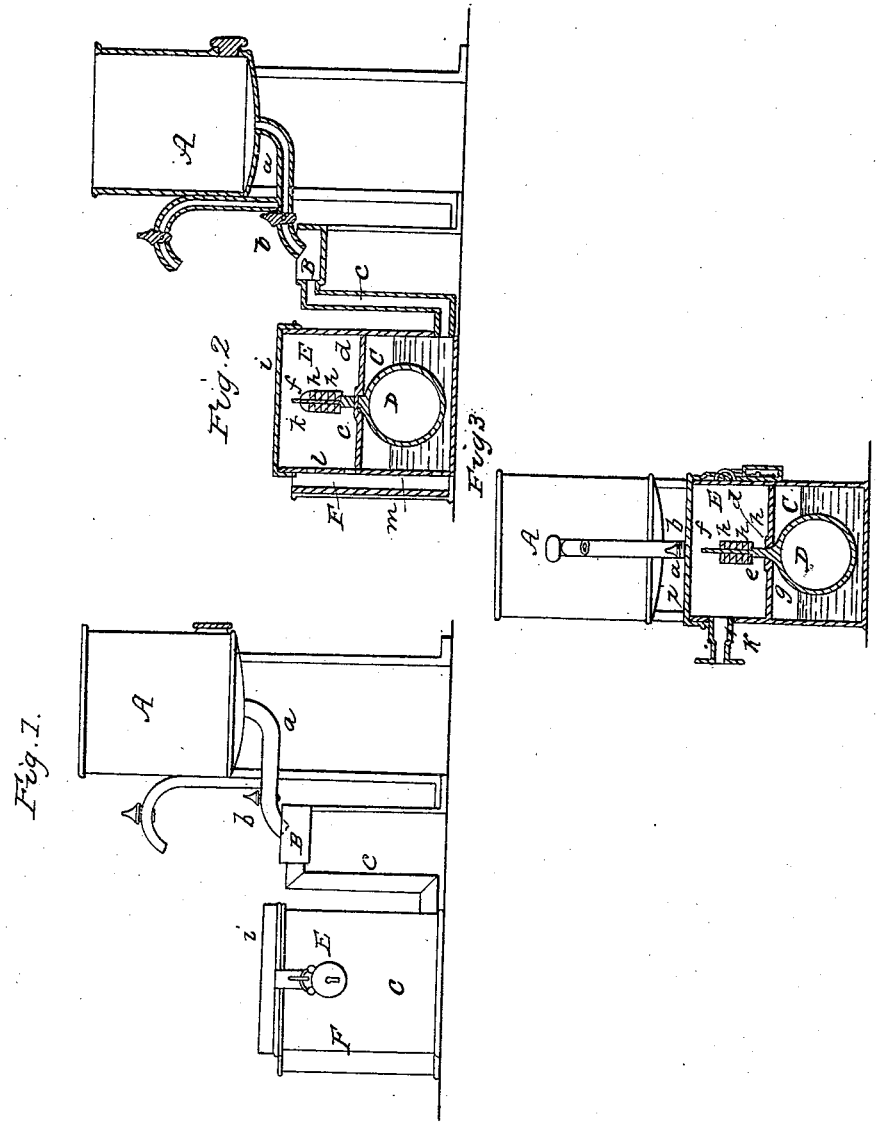
WITNESSES
Frederick Curtis
F. P. Hale Jr
INVENTOR
G. A. Jasper
by his attorney
R. H. Eddy

UNITED STATES PATENT OFFICE.

GUSTAVUS A. JASPER, OF CHARLESTOWN, MASSACHUSETTS.

IMPROVED APPARATUS FOR DETECTING SUGAR, &c., IN WASTE LIQUIDS.

Specification forming part of Letters Patent No. 41,008, dated December 22, 1863.

*To all whom it may concern:*

Be it known that I, GUSTAVUS A. JASPER, a resident of Charlestown, in the county of Middlesex and State of Massachusetts, have invented a new and useful Sweet-Water Detector, or Apparatus for Detecting Saccharine Matter in Solution; and I do hereby declare the same to be fully described in the following specification and represented in the accompanying drawings, of which—

Figure 1 denotes a side elevation, and Fig. 2 a longitudinal and vertical section, of it; Fig. 3, a transverse section taken through the valve and float and the eduction-passage of the efflux-chamber, to be hereinafter explained.

The object of my invention is to prevent waste of saccharine matter during the process of cleansing the charcoal or filtering contents of a filter, such as is generally used in a sugar-refinery for the purpose of filtering sirup. In washing the filters it sometimes happens that more or less water charged with saccharine matter is suffered to flow away into the waste-sewer. With my invention none of this water, when sufficiently sweet to warrant its evaporation to obtain the sugar in it, can be lost, for when it may contain any such amount of saccharine matter an overflow of the liquor in the overflow-cistern of the apparatus will take place, and thereby indicate to an attendant the presence of the sugar in the liquor.

In the drawings, A may be supposed to denote a charcoal-filter of the ordinary kind,— as used in a sugar-refinery, with the exception of the charcoal charge or filtering medium thereof, $a$ being the waste-pipe extending out of the bottom of the filter and being provided with a faucet or stop-cock, $b$. Immediately underneath the eduction-opening of the pipe $a$ there is placed a small reservoir or overflow-cistern, B, out of which a pipe, $c$, leads and opens into a close chamber, C, in the central part of whose top there is a valve-opening, $d$, provided with an annular valve-seat, $e$. When desirable, there may be applied to the said overflow-cistern a suitable means of intercepting the syrup which may be discharged from it. Within the chamber C there is a float, D, provided with a stem, $f$, which extends up through the valve opening, and is furnished with a valve, $g$, to close upward against the said seat. The stem has one or more weights, $h\ h\ h$, placed on or encompassing it, they being within another or efflux-chamber, E, situated directly over the chamber C, and provided with a cover or lid, $i$ which may be hinged to the chamber E, and be furnished with a lock or means of locking it down, so that it cannot be opened by the workman whose duty it may be to cleanse the filter. A small discharging-opening, $k$, is made in the side of the efflux-chamber. There is also another such opening, $l$, leading out of the said efflux-chamber, and into an auxiliary chamber or cistern, F, arranged against the outside surface of the two chambers C and E, and open at top, and having a glass window or pane, $m$, inserted in one side of it, the purpose of the chamber F being to enable a thermometer to be used at any time for ascertaining the temperature of the liquor that may be run into the efflux-chamber, such thermometer under such circumstances being inserted in the said chamber F, in which case the scale of the thermometer may be observed through the said window or pane thereof. The float and its weights are to be so made and adjusted as to rise and close the valve against its seat whenever water duly charged with saccharine matter may be within the chamber C, the float causing the valve to descend from its seat whenever the water may be free from such matter to such an extent as would render unprofitable the saving of the water for the purpose of being evaporated in order to obtain its sugar.

My invention, although intended to be employed as a detector of saccharine matter in a fluid, is also applicable to the detection of a saline or other matter held in solution, and, consequently, my said invention can often be used to advantage with an apparatus for filtering a saline or other solution.

I claim as my invention—

1. The sweet-water detector, or combination of the overflow pan or vessel B, the induction-chamber C and its float D, valve $g$, and valve-seat $e$, arranged and combined together substantially in manner and so as to co-operate as described.

2. The combination of the said sweet-water detector, a filter, A, and a pipe, $a$, or equivalent means of conducting a fluid from the filter into the said sweet-water detector.

3. The sweet-water detector, as not only made of the overflow pan or vessel B, the induction-chamber C and float D, valve $g$, and valve-seat $e$, but as having an efflux-chamber, E, or an auxiliary thermometer-chamber, F, or both, as circumstances may require.

GUSTAVUS A. JASPER.

Witnesses:
R. H. EDDY,
F. P. HALE, Jr.